United States Patent [19]

Taylor

[11] Patent Number: 5,236,214
[45] Date of Patent: Aug. 17, 1993

[54] UNDERLIFT TOWING APPARATUS

[75] Inventor: William L. Taylor, Eupora, Miss.

[73] Assignee: Taylor-Made Equipment Co., Inc., Eupora, Miss.

[21] Appl. No.: 863,840

[22] Filed: Apr. 6, 1992

[51] Int. Cl.$^5$ ............................................. B60D 1/155
[52] U.S. Cl. .............................. 280/402; 280/479.2; 280/494; 280/499; 414/563
[58] Field of Search .............. 280/479.2, 479.3, 479.1, 280/478.1, 462, 493, 494, 499, 402; 414/563

[56] References Cited

U.S. PATENT DOCUMENTS

| | | | |
|---|---|---|---|
| 3,649,048 | 3/1972 | Garnett | 280/491.3 |
| 4,515,387 | 5/1985 | Schuck | 280/479.2 |
| 4,611,968 | 9/1986 | Casteel | 414/563 |
| 4,797,057 | 1/1989 | Shoup et al. | 414/563 |
| 4,927,315 | 5/1990 | Nespor | 414/563 |
| 4,946,182 | 8/1990 | Weber | 414/563 |
| 4,955,777 | 9/1990 | Ineson | 414/563 |
| 4,991,865 | 2/1991 | Francisco | 280/479.2 |
| 5,009,446 | 4/1991 | Davis | 280/479.2 |

FOREIGN PATENT DOCUMENTS 9110574 3/1991 World Int. Prop. O. ........ 280/479.2

*Primary Examiner*—Margaret A. Focarino
*Assistant Examiner*—Kevin Hurley
*Attorney, Agent, or Firm*—Alan Ruderman

[57] ABSTRACT

Towing apparatus mounted on the rear of a towing vehicle for lifting and towing disabled vehicles includes an extendible boom assembly positionable beneath the undercarriage of the vehicle to be towed. The boom assembly is carried by a vertically and pivotably movable housing assembly mounted on the towing vehicle and is pivotable relative to the housing assembly. The boom assembly includes a number of extendible boom stages telescopically mounted within first and second stage boom members, the first stage boom member being pivotably mounted on the housing assembly. Second stage boom member is mounted within and pivotable relative to the first stage boom member about a vertical axis so as to move from side-to-side, the extendible boom stages moving with the second stage boom member. The first stage boom member has an enlarged mouth through which the second stage boom member extends, the large mouth permitting the second stage to have substantial sideways movement. The extendible boom members may be moved vertically, tilted relative to the vertical, moved side-to-side and extend and retract so as to provide a towing vehicle operator with a multitude of positioning capabilities.

19 Claims, 2 Drawing Sheets

UNDERLIFT TOWING APPARATUS

BACKGROUND OF THE INVENTION

This invention relates to vehicle lifting and towing apparatus and more particularly to apparatus of this type having a boom adapted to extend beneath a vehicle and be selectively moved in three planes for readily positioning a lifting assembly at the end thereof for engaging and lifting the undercarriage of a disabled vehicle.

The known apparatus for lifting and towing disabled vehicles includes that of attaching a hook on the end of a cable or the like to a bumper or undercarriage of the vehicle, the cable being carried by a tiltable boom. The boom is first lowered, the cable paid-out and attached to the disabled vehicle, and thereafter the cable is retracted until taut and the boom raised. Variations of this basic apparatus include vehicles which carry a boom positionable beneath a disabled vehicle, the boom carrying a lifting assembly at the free end. The lifting assembly includes a cross-member that spans the undercarriage of the disabled vehicle and carries yokes or the like which receive the axle or other member of the undercarriage of the vehicle. Recently, in regard to automobiles, wheel lift apparatus have been developed for lifting and towing the vehicles by its wheels, a pair of wheel supporting frames being disposed on the end of a boom which is raised to lift the wheels and thus the vehicle Other lifting and towing vehicles include those having a slidable and tiltable flat bed wherein the bed is tilted and slid rearwardly to receive the disabled vehicle and then returned to the flat forward position.

In regard to those systems having a boom positionable beneath the disabled vehicle, these being the systems to which the present invention pertains, the operator must position the boom beneath the disabled vehicle so as to grasp and connect to the axle, a frame member or some other portion of the undercarriage thereof. With many of the present booms, a series of telescoping boom members must be extended and manipulated to position the lifting assembly to the desired location. This process can be challenging and time consuming especially where the disabled vehicle or the like is at an awkward location. This may require, for example, backing up the towing vehicle a number of times and repositioning the boom until the lifting assembly cross-bar is positioned correctly relative to the vehicle to be towed.

SUMMARY OF THE INVENTION

Consequently, it is a primary object of the present invention to provide towing apparatus which permits the boom to be positioned readily for attachment to the undercarriage of a vehicle to be towed.

It is another object of the present invention to provide vehicle lifting and towing apparatus having a lifting boom readily pivotable about a number of axes including a vertical axis so that a lifting assembly carried by the boom may be easily positioned beneath a vehicle to be towed.

It is a further object of the present invention to provide apparatus for lifting and towing vehicles including large vehicles such as trucks and trailers and the like, the apparatus including an extendible lifting boom which is pivotable about a horizontal axis so as to raise and lower relative thereto and which is pivotable about a vertical axis so as to move from side-to-side selectively.

Accordingly, the present invention provides apparatus carried by a towing vehicle for lifting and towing a disabled vehicle or the like, the apparatus including a lift assembly removably mounted on an extendible boom member of a boom assembly positionable beneath the undercarriage of the vehicle to be towed. The boom assembly is carried by a housing vertically and pivotably mounted on the towing vehicle and is pivotable relatively to the housing. The boom assembly includes a number of extendible boom stages telescopically mounted within first and second stage boom members so as to extend and retract relatively thereto. The second stage boom member is disposed within and pivotable relatively to the first stage about a vertical axis and constrains the extendible boom stages to move sideways therewith. Power drive assemblies may be selectively actuated to move the second stage and thus the extendible stages from one side to the other. The combination of the vertical and pivotable movement of the housing, the extension of the boom and the side-to-side movement of the boom readily permits the end of the boom and a lift assembly carried thereby to be easily and correctly positioned beneath the vehicle to be towed. The power drive assemblies which provide the side-to-side movement of the second and subsequent stages relatively to the first stage boom also act to pivot the boom to a stowed position relative to the housing.

BRIEF DESCRIPTION OF THE DRAWINGS

The particular features and advantages of the invention as well as other objects will become apparent from the following description taken in connection with the accompanying drawings in which.

DESCRIPTION OF THE PREFERRED EMBODIMENT

Figure 1:
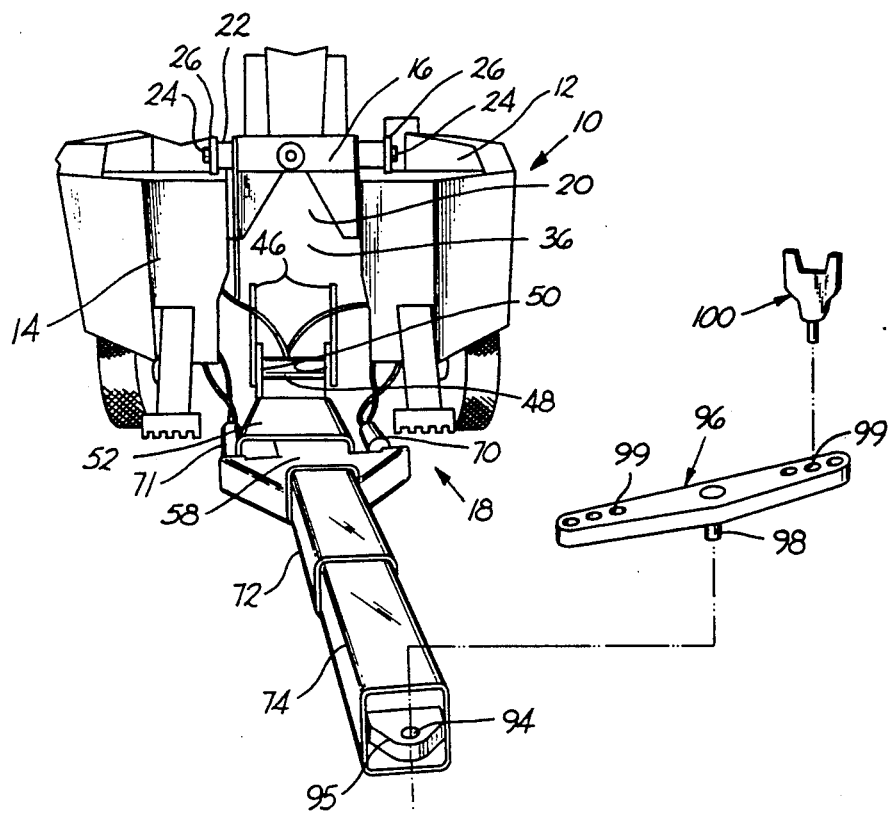
FIG. 1 is a rear perspective view of a towing vehicle having mounted thereon lifting and towing apparatus constructed in accordance with the principles of the present invention, the lifting and towing apparatus being illustrated in the extended operative position.

Referring now to the drawings, FIG. 1 illustrates the rear of a towing vehicle in the form of a truck 10 having a bed 12 and a tailboard 14 at the rear end, a central portion being cut out of the tailboard for receiving an outer upright housing 16 of the towing apparatus 18. The outer upright housing 16 is a substantially elongated rectangular structure having an opening 20 at the major portion of the rear beneath the rear upper portion, the opening being formed by removal of a substantial portion of the rear surface of the outer housing 16. Adjacent the upper front portion of the housing 16 and extending beyond each side of the upright housing is an elongated channel 22 within which a stub shaft 24 is fixed. The ends of the stub shaft 24 extend out the ends of the channel 22 and are journally supported in a pair of spaced apart support plates 26 welded to the sill channel 28 of the frame of the truck 10. Fixed to the front of the upright housing 16 beneath the channel 22 are a pair of spaced apart ears 30 (only one of which is illustrated), each ear pivotable mounting one end, e.g., the rod end 32 of a power cylinder 34 having the head end pivotable connected to the sill channel 28 of the truck. Thus, when the cylinder 24 is actuated to extend the rod 32 the outer upright housing 16 is tilted rearwardly about the shaft as a pivot. The cylinders 34 thus act as tilt cylinders.

Disposed within the outer upright housing 16 and slidable within tracks formed by blocks 35 welded to the interior of the outer upright housing is an inner upright housing 36 which is also in the form of a hollow elongated rectangular structure, the inner housing having guide bars 37 welded thereto and positioned within the tracks formed by the blocks. A power cylinder 38 is axially disposed within the inner upright housing 36 and has a boss 40 at one end, e.g., the head end, the boss being secured as by welding to the outer housing 16 adjacent the top thereof. The other end, e.g., the rod end 42 of the power cylinder 38 is pivotably connected to a boss 44 which is in turn secured as by welding to the inner upright cylinder 38 adjacent the bottom thereof. Thus, when the cylinder 38 is actuated to extend the rod 42 the inner upright housing 36 is lowered relative to the outer upright housing 16 and vice versa when the rod is retracted. The cylinder 38 thus acts as a lift cylinder.

Figure 3:
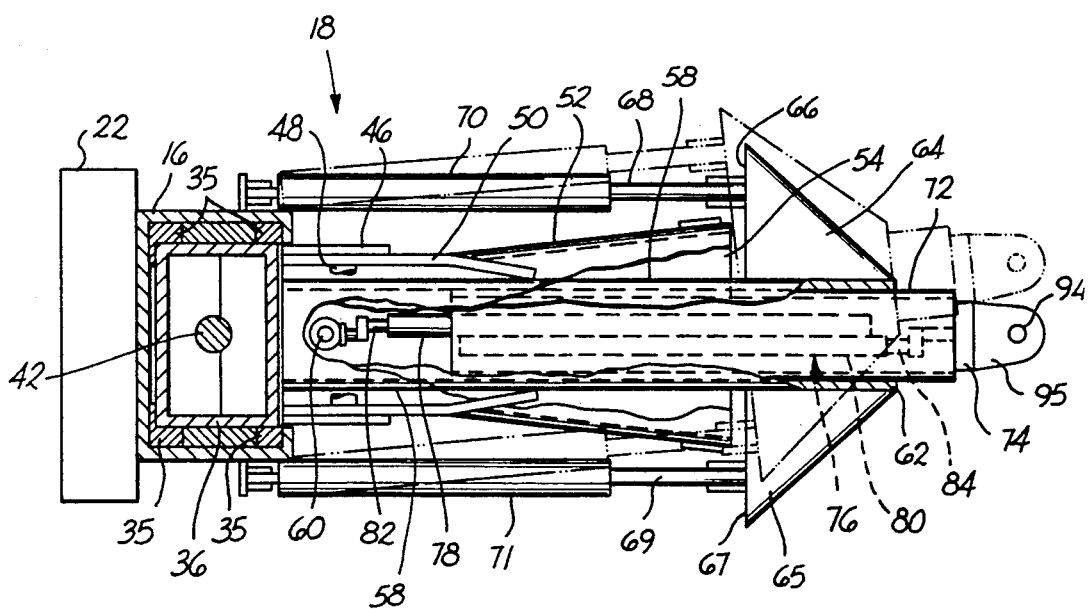
FIG. 3 is a cross sectional view taken substantially along line 3—3 of FIG. 2.
Figure 2:
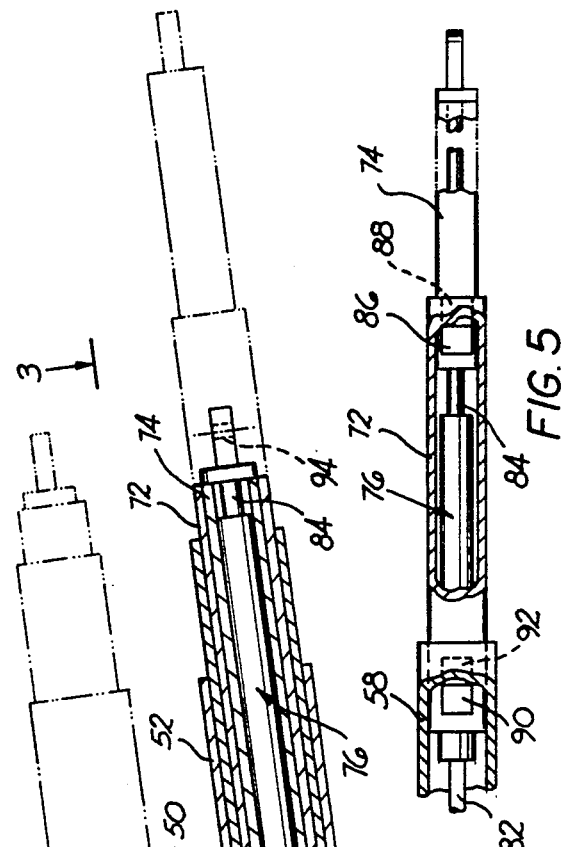
FIG. 2 is a vertical cross sectional view taken substantially through the lifting and towing apparatus of FIG. 1 with the boom in the retracted position.

The rear end of the inner upright housing 36 has a pair of spaced apart upstanding ears 46 having holes through which a rod or shaft 48 is positioned to span the ears. Also positioned on the rod 48 is another pair of spaced apart ears 50 which are secured as by welding to the upper surface of a first stage boom member 52 in the form of a hollow housing which, as best illustrated in FIG. 3, has a rectangular configuration adjacent the portion carrying the ears 50 and diverges from the rectangular portion to a wide mouth opening 54 at the end remote from the rod 48. The other end of the first stage boom member 52 has a forward extension 56, in the disposition illustrated in FIG. 2, which extends beneath the inner housing 36 and abuts the rear wall of the inner housing in the lowered disposition of the first stage boom member 52 as illustrated in FIG. 2.

Disposed within the first stage boom member 52 is a second stage boom member 58, the second stage boom member being a hollow elongated rectangular body having one end pivotably mounted about a pin 60 fastened within the first stage remote from the mouth 54, and another end 62 extending out the mouth 54 of the first stage boom member 52. At the end 62 the second stage member has a pair of extensions or wings 64, 65, one wing being at each side of the second stage body. As illustrated, the wings may have a triangular or delta configuration with a respective wall 66, 67 facing toward the housing 36 and the mouth 54 of the first stage boom member. Attached to a pair of lugs on each face 66, 67 of the extensions is the respective end, e.g., the rod end 68, 69 of a respective power cylinder 70, 71, the head ends of which are attached between a pair of lugs on respective spaced apart bottom portions of the inner upright housing 36. It may thus be seen that either of the cylinders 70, 71 may be actuated to extend its rod and thereby pivot the second stage 58 about the pin 60 sideways relative to the first stage 52. Of course, one of the cylinders 70 may be actuated and the other cylinder may be exhausted so as to accomplish the side-to-side motion. The wide mouth 54 at the open end of the first stage boom member and the diverging walls thereof permit a relatively large degree of movement. The wider the mouth 54 and the longer the diverging portion of the first stage boom ember, the greater the amount of side-to-side movement of the second stage boom member. Typically the side-to-side swing may be in the order of 8 inches or four inches on each side of the center line of the boom member where the pin 60 preferably is disposed.

Figure 4:
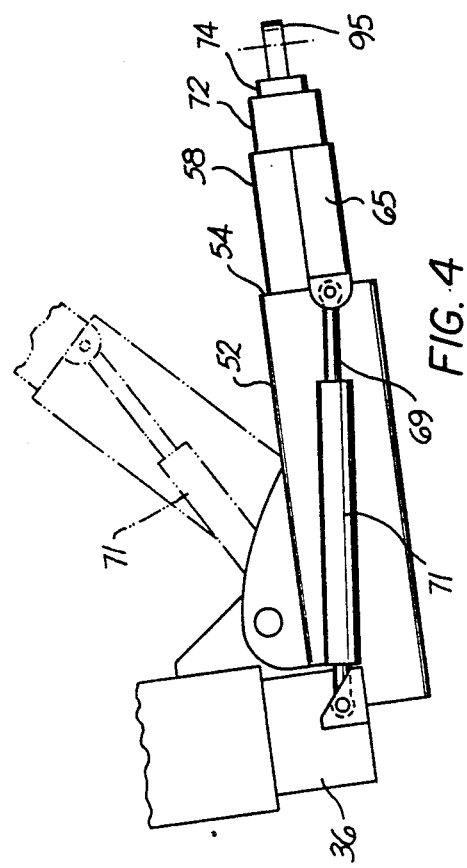
FIG. 4 is a fragmentary cross sectional view of a portion of the structure illustrated in FIG. 2, but illustrating a step in the stowing of the boom.

Moreover, the cylinder 70, 71 which provide the side-to-side movement to the second stage boom member may be actuated in unison to pivot the second stage and thus the first stage together therewith about the pivot 48 where they attach to the inner upright housing as illustrated in FIG. 4. This results in the first and second stage boom members pivoting to a stow position adjacent the opening 20 in the outer upright housing 16 and the rear surface of the inner upright housing 36. To pivot the booms to the operative position illustrated in FIG. 2 from the stow position, the rods 68, 69 of both cylinders are retracted. Thus, the cylinders 68, 69 serve a two-fold function i.e., to move the second stage boom member side-to-side relative to the first stage boom member and as stow positioning cylinders.

Telescopically disposed within the hollow of the second stage boom member 58 is a third stage boom member 72 which is merely an elongated hollow housing having slightly smaller external dimensions than the internal dimensions of the second stage. Additionally, a fourth stage boom housing 74 may be telescopically disposed within the third stage 72. Disposed within and extending axially through the second stage, third stage and fourth stage boom members is a piggyback cylinder actuator 76, i.e., a pair of side-by-side cylinder housings 78, 80 having their respective piston rods 82, 84 extending out in opposite directions. The end of one rod, e.g. 82 is connected within the first and second stage booms about the pin 60 while the end of the other rod 84 is secured to the interior wall of the fourth stage boom member 74 at the end remote from the pin 60.

Figure 5:
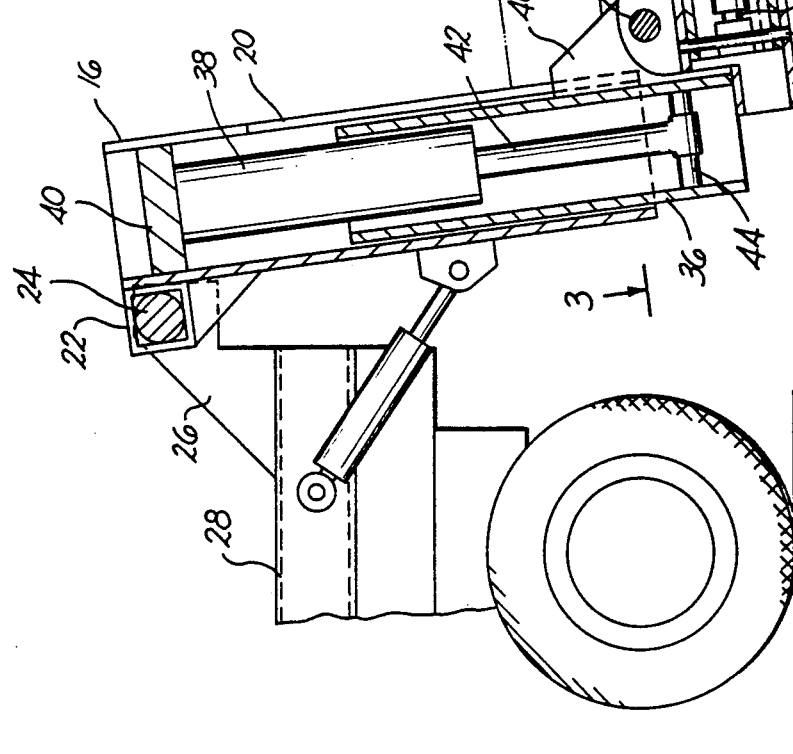
FIG. 5 is a fragmentary cross sectional view with parts broken away and with the booms extended to illustrate internal boom stops.

As illustrated in FIG. 5, respective stop members in the form of small plates 86, 88 may be welded to the exterior side surfaces of the fourth stage boom member at the end closest to the pin 60 and to the interior side surfaces of the third stage boom member 72 at the end furthest from the pin 60. Also similar stop members 90, 92 respectively are attached to the opposite external side surfaces of the third stage boom member at the end closest to the pin 60 and to the interior side surfaces of the second stage boom member 58 at the end furthest from the pin 60. Thus, extension of the piston rods 82 and 84 drives the fourth stage boom member relative to the remaining boom members until the stop members 86 contact the cooperating stop members 88 of the third stage boom member. Thereafter, as the fourth stage boom member moves away from the second stage boom member the third stage boom member moves with it. The third stage boom member may be extended until its stop members 90 contact the second stage stop members 92. Accordingly, the cooperating stop members 86, 88 of the third and fourth stage boom members drives the third stage boom member out of the second stage boom member as the fourth stage boom member is extended, and prevents the fourth stage boom member from being completely extracted from the third stage boom member. The cooperating stop members 90, 92 of the second and third stage boom members similarly prevent the third stage boom member from dislodging out from the second and first stage boom members.

Removably carried within a bore 94 within a lug 95 at the free end of the fourth stage boom member is a conventional disabled vehicle lifting assembly 96 in the form of a cross-member adapted to span the undercarriage of a disabled vehicle, the cross-member having a boss 98 affixed thereto and adapted to be received within the bore 94. The cross-member includes a plurality of bores 99 spaced at intervals at each side of the boss 98 at varying distances, a corresponding bore on each side adapted to receive a respective yoke 100 (only one of which is illustrated) for cradling the axle or axles of a disabled vehicle within the crotch of the respective yoke. Of course, other conventional undercarriage engaging members may be utilized to engage and lift the disabled vehicle.

Each of the cylinders 34, 38, 71, 72 and 78, 80 conventionally are hydraulic cylinders which may be selectively actuated by the operator of the towing apparatus. Thus, the operator may lower the inner upright housing 36 by actuating the cylinder 38 and thereafter moving the booms 52, 58, 72, 74 to the operative position by retracting the rods 68, 69 in unison into the respective stow/side-by-side cylinder 70, 71. The third and fourth stage boom members 72 and 74 may then be extended to beneath the undercarriage of the vehicle to be towed with the vehicle lift assembly 96 on the end of the fourth stage boom member. If, as is the usual situation, the assembly 96 is not in the correct position to receive the axles or other members of the disabled vehicle, a selected one of the cylinders 70 or 71 may be actuated to move the second boom member and thus the third and fourth boom members to one side or the other until the assembly 96 is properly positioned. Thereafter the lift cylinder 38 is raised and the tilt cylinders 34 actuated until the disabled vehicle is at the correct attitude and elevation for towing. After completion of the towing operation, the various members may be returned to the inoperative and stowed condition by reversing the aforesaid steps.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. Towing apparatus carried at the rear of a towing vehicle for lifting and towing a disabled vehicle, said towing apparatus comprising support means secured to the towing vehicle, a first stage boom member pivotally mounted on said support means for movement about a substantially horizontal axis relatively to said support means, said first stage boom member comprising a hollow housing having one end adjacent to said axis and an open second end remote from said axis, a second stage boom member comprising a hollow housing having a first end and an open second end, said first end of said second stage boom member being disposed within said first stage boom member and said second end of said second boom member being disposed externally of said second end of said first stage boom member, means for pivotally mounting said second stage boom member within said first stage boom member for movement about a second axis lying in a plane substantially normal to said horizontal axis, said second end of said first stage boom member having a dimension in a side direction parallel to said horizontal axis substantially larger than the dimension of said second stage boom member in said side direction, force applying means for pivotally moving said second stage boom member relative to said first stage boom member selectively to one side or the other about said second axis, and at least another boom member disposed within said second stage boom member and selectively extendible out said second end of said second stage boom member for supporting disabled vehicle engaging means.

2. Towing apparatus as recited in claim 1, wherein said first stage boom member includes spaced side walls diverging one from the other from a location at least intermediate said first and second ends of said first stage boom member toward said second end of said first stage boom member.

3. Towing apparatus as recited in claim 1, wherein said second stage boom member includes a wing fixed at each side thereof extending outwardly beyond said second end of said first stage boom member, said force applying means comprising power drive means acting between each wing and said support means for pivoting said second boom member relative to said first boom member upon actuation of the power drive means between one wing and said support means.

4. Towing apparatus as recited in claim 3, wherein said power drive means comprises a first member extendible relative to a second member and a third member extendible relative to a fourth member, means for connecting said first and second members between a first wing and said support means and means for connecting said third and fourth members between a second wing and said support means, whereby extension of said first member relative to said second member or said third member relative to said fourth member pivots said second stage boom relative to said first stage boom.

5. Towing apparatus as recited in claim 2, wherein said second stage boom member has side walls spaced apart less than the spacing between the side walls of said first stage boom member at said location.

6. Towing apparatus as recited in claim 5, wherein said second stage boom member includes a wing fixed at each side thereof extending outwardly beyond said second end of said first stage boom member, said force applying means comprising power drive means acting between each wing and said support means for pivoting said second boom member relative to said first boom member upon actuation of the power drive means between one wing and said support means.

7. Towing apparatus as recited in claim 6, wherein said power drive means comprises a first member extendible relative to a second member and a third member extendible relative to a fourth member, means for connecting said first and second members between a first wing and said support means and means for connecting said third and fourth members between a second wing and said support means, whereby extension of said first member relative to said second member or said third member relative to said fourth member pivots said second stage boom relative to said first stage boom.

8. Towing apparatus as recited in claim 2, wherein said support means comprises a housing mounted on said towing vehicle for slidable movement in a plane substantially normal to said horizontal axis, and means for journally mounting said first stage boom member on said housing.

9. Towing apparatus as recited in claim 8, wherein said second stage boom member includes a wing fixed at each side thereof extending outwardly beyond said second end of said first stage boom member, said force applying means comprising power drive means acting between each wing and said support means for pivoting said second boom member relative to said first boom member upon actuation of the power drive means between one wing and said support means.

10. Towing apparatus as recited in claim 9, wherein said power drive means is disposed for pivoting said first stage boom member about said horizontal axis upon simultaneous actuation of the power drive means between both wings and said support means.

11. Towing apparatus as recited in claim 7, wherein said support means comprises a first housing pivotably mounted on said towing vehicle for movement about an axis parallel to said horizontal axis, a second housing telescopically received within said first housing, means for slidably moving said second housing relative to said first housing, means for pivotally mounting said first stage boom member on said second housing, whereby movement of said second housing relative to said first housing moves said horizontal axis and said first and second boom members therewith.

12. Towing apparatus as recited in claim 11, wherein said second stage boom member includes a wing fixed at each side thereof extending outwardly beyond said second end of said first stage boom member, said force applying means comprising power drive means acting between each wing and said support means for pivoting said second boom member relative to said first boom member upon actuation of the power drive means between one wing and said support means.

13. Towing apparatus as recited in claim 12, wherein said power drive means is disposed for pivoting said first stage boom member about said horizontal axis upon simultaneous actuation of the power drive means between both wings and said support means.

14. Towing apparatus as recited in claim 5, wherein said support means comprises a housing mounted on said towing vehicle for slidable movement in a plane substantially normal to said horizontal axis, and means for journally mounting said first stage boom member on said housing.

15. Towing apparatus as recited in claim 5, wherein said support means comprises a first housing pivotally mounted on said towing vehicle for movement about an axis parallel to said horizontal axis, a second housing telescopically received within said first housing, means for slidably moving said second housing relative to said first housing, means for pivotally mounting said first stage boom member on said second housing, whereby movement of said second housing relative to said first housing moves said horizontal axis and said first and second boom members therewith.

16. Towing apparatus as recited in claim 15, wherein said second stage boom member includes a wing fixed at each side thereof extending outwardly beyond said second end of said first stage boom member, said force applying means comprising power drive means acting between each wing and said support means for pivoting said second boom member relative to said first boom member upon actuation of the power drive means between one wing and said support means.

17. Towing apparatus as recited in claim 16, wherein said support means comprises a first housing pivotally mounted on said towing vehicle for movement about an axis parallel to said horizontal axis, a second housing telescopically received within said first housing, means for slidably moving said second housing relative to said first housing, means for pivotably mounting said first stage boom member on said second housing, whereby movement of said second housing relative to said first housing moves said horizontal axis and said first and second boom members therewith.

18. Towing apparatus as recited in claim 17, wherein said support means comprises a housing mounted on said towing vehicle for slidable movement in a plane substantially normal to said horizontal axis, and means for journally mounting said first stage boom member on said housing.

19. Towing apparatus as recited in claim 18, wherein said support means comprises a first housing pivotally mounted on said towing vehicle for movement about an axis parallel to said horizontal axis, a second housing telescopically received within said first housing, means for slidably moving said second housing relative to said first housing, means for pivotally mounting said first stage boom member on said second housing, whereby movement of said second housing relative to said first housing moves said horizontal axis and said first and second boom members therewith.

* * * * *